United States Patent [19]

Cooper

[11] 4,186,622
[45] Feb. 5, 1980

[54] REDUNDANT FLIGHT CONTROL SYSTEM

[75] Inventor: Dean E. Cooper, Trumbull, Conn.

[73] Assignee: United Technologies Corporation, Hartford, Conn.

[21] Appl. No.: 846,093

[22] Filed: Oct. 27, 1977

[51] Int. Cl.² .......................... B64C 13/04; F16C 1/10
[52] U.S. Cl. ..................... 74/501 R; 74/470; 244/83 K
[58] Field of Search ............ 74/470, 486, 487, 501 R, 74/501.5 R

[56] References Cited

U.S. PATENT DOCUMENTS

| | | | |
|---|---|---|---|
| 2,581,080 | 1/1952 | Cushman | 74/501.5 R |
| 2,810,300 | 10/1957 | Pigford | 74/501.5 R |
| 2,841,030 | 7/1958 | Wrighton | 74/501.5 R |
| 2,856,790 | 10/1958 | Norton | 74/501.5 R |
| 2,865,224 | 12/1958 | Krouse | 74/501 R |
| 3,199,601 | 8/1965 | Dean et al. | 74/481 |
| 3,277,738 | 10/1966 | Glauser et al. | 74/501.5 R |
| 3,316,775 | 5/1967 | Wrighton et al. | 74/501.5 R |
| 3,473,407 | 10/1969 | Hicks | 74/501.5 R |
| 3,532,302 | 10/1970 | Dean | 244/17.19 |
| 3,919,897 | 11/1975 | Yang | 74/501.5 R |

FOREIGN PATENT DOCUMENTS 1037800 8/1958 Fed. Rep. of Germany ........ 74/501 R

Primary Examiner—Lawrence J. Staab
Attorney, Agent, or Firm—Vernon F. Hauschild

[57] ABSTRACT

A flight control system utilizing pilot actuated flexible cables to selectively move a control quadrant and utilizing preloaded bungees additionally connecting each cable to the quadrant so that the quadrant can be pilot actuated despite the severance of one of the cables.

8 Claims, 3 Drawing Figures

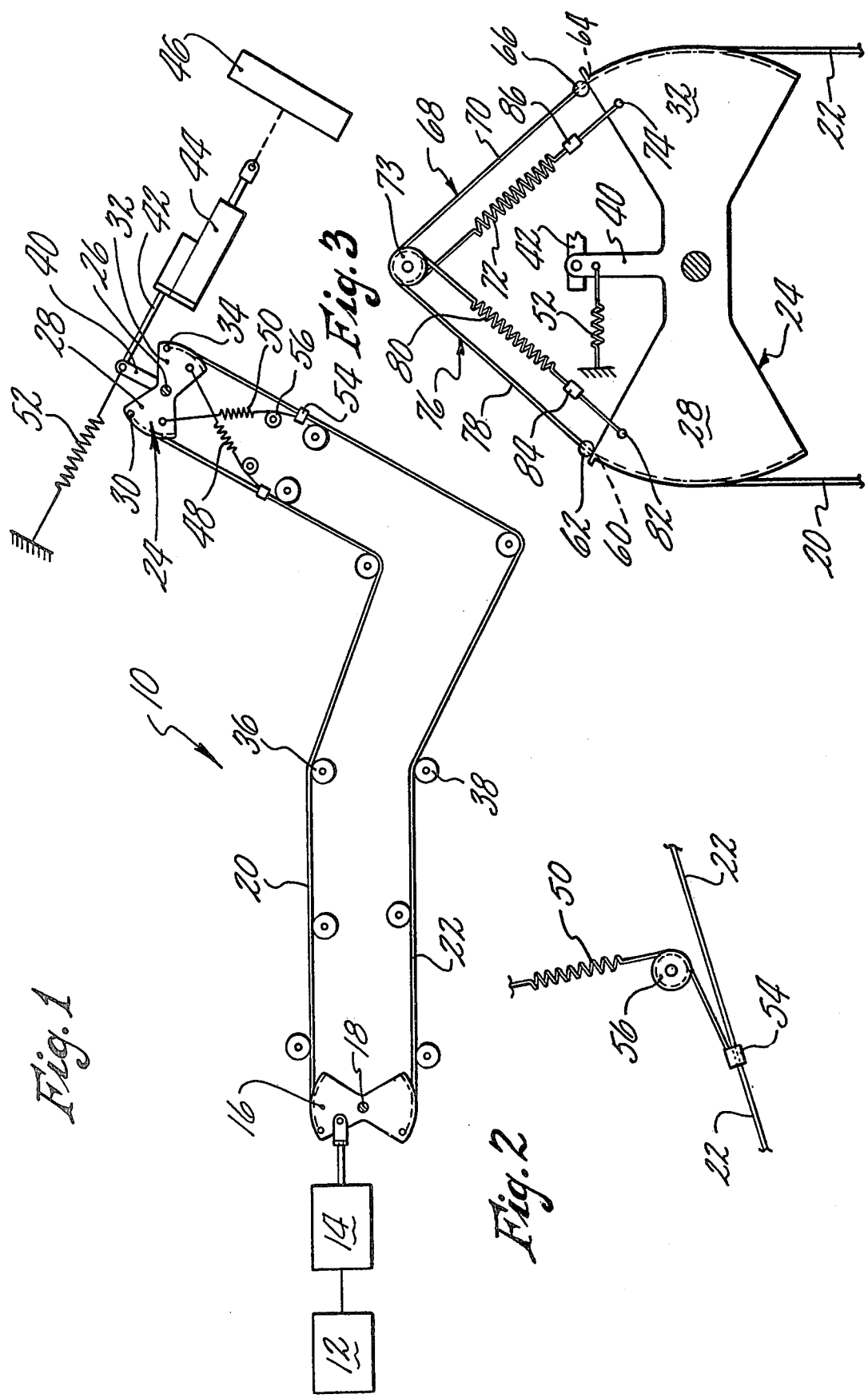

REDUNDANT FLIGHT CONTROL SYSTEM

The invention herein described was made in the course of or under a contract or sub-contract thereunder, with the Department of the Army.

BACKGROUND OF THE INVENTION

1. Field of Invention

This invention relates to aircraft flight control systems wherein the pilot actuates flexible cables to selectively position a control quadrant and thereby effect the desired flight control and more particularly to such a system which is redundant and which can continue to be operated throughout its full control regime despite the severance of one of the cables.

2. Description of the Prior Art

In this flight control art, centering springs have been used to position the quadrant under control by flexible cables to a preselected setting, should one of the flexible cables be severed. By selective control rigging, such emergency positioning can provide a predetermined amount of anti-torque and directional control to the tail rotor of a helicopter, for example. However, in such a system the pilot has only this minimal control following a cable severance which may not be adequate to cover the wide range of anti-torque requirements with varying helicopter gross weight and ambient operating conditions and would be inadequate for primary surfaces required for pitch and roll control.

In addition, duplicate flexible cables systems and rigid push-pull tube-cable systems have been utilized, but these have proven to have high friction and to be unduly heavy and expensive. There are many prior art patents, such as U.S. Pat. No. 2,280,106, which include mechanisms brought into play upon the severance of a flexible cable which serves to prevent a "hard over" of the flight control surface under control, but in all such systems the pilot cannot exercise control following a cable severance.

SUMMARY OF THE INVENTION

A primary object of the present invention is to provide an improved flight control system in which pilot actuated flexible cables are connected to a control quadrant in a manner to provide redundant control of the quadrant so that severance of either cable will not cause the pilot to lose control of the quadrant.

It is a further object of the present invention to teach such an improved flight control system which can be utilized with at least one additional quadrant positioning mechanism to provide a third chance redundant system.

In accordance with the further aspect of the present invention, preloaded bungees are used to connect flexible cables to the control quadrant and bungee preload indicators are provided to advise the pilot of the control options available to him in case of a flexible cable severance.

It is a further object for the present invention to provide such a flight control system which is not only redundant but which is light in weight and simple in construction so as to afford ease of maintenance.

It is a further object of the present system to cause the preloaded bungees to be connected to the flexible cables in substantially parallel orientation thereto so as not to side-load flexible cables.

Other objects and advantages of the present invention may be seen by referring to the following description and claims, read in conjunction with the accompanying drawings.

BRIEF DESCRIPTION OF THE DRAWINGS

FIG. 1 is a showing of my redundant flight control system.

FIG. 2 is an enlarged showing of a portion of the FIG. 1 system to illustrate how the preloaded bungees therein are connected to the flexible cable members so as to be in parallel relationship thereto.

FIG. 3 is a showing of a portion of a modification of my flight control system, the preferred embodiment.

DESCRIPTION OF THE PREFERRED EMBODIMENT

Referring to FIG. 1 we see a preferred embodiment of my redundant flight control system 10 illustrated to control the pitch of the helicopter tail rotor, however, it should be borne in mind that the system could be utilized to selectively control any of the aircraft parts or control surfaces conventionally controlled by flight control systems. Quadrant controls of the type disclosed herein are also used on tanks, ships and elsewhere outside the aircraft field. In the FIG. 1 system, pilot actuated foot pedals 12 impart pilot control motion to a conventional mixing unit 14, which in turn along with collective control serve to position control quadrant 16, which is mounted for either clockwise or counterclockwise rotational motion about axis of rotation 18. Flexible cables 20 and 22 are connected to control quadrant 16 and are further connected at their opposite ends to control quadrant 24, which is mounted for both clockwise and counterclockwise rotational motion about axis of rotation 26. As used herein, "flexible" cables are cables which are capable of flexing but not stretching. As shown in FIG. 1, cable 20 connects to the left arm 28 of control quadrant 24 at connecting point 30, while cable 22 connects to the right arm 32 of control quadrant 24 at connecting point 34. The path of cables 20 annd 22 is established by selectively positioned pulley or roller systems 36 and 38, respectively, through which the cables are reeved in conventional fashion so that control quadrant 24 follows the pilot imparted motions of control quadrant 16 as desired and preferably in unison therewith.

Control quadrant 24 includes control output arm 40, which is pivotally connected to control input arm 42 of the tail rotor servo 44 which is actuated thereby in conventional fashion to control the pitch of helicopter tail rotor 46 and hence control both the yaw moment imposed upon the helicopter and its direction.

With cables 20 and 22 arranged as shown in FIG. 1, it will be evident that when the pilot causes cable 20 to pull upon the left arm 28 of control quadrant 24, the quadrant will move in a counterclockwise direction, and when the pilot causes cable 22 to pull upon the right arm 32 of quadrant 24, the quadrant will more in a clockwise direction. A problem in such a system is that if either cable 20 or cable 22 is severed ballistically or otherwise, control is lost of control quadrant 24.

To avoid this problem by adding redundancy to the system, I have added preloaded bungee cross-ties 48–50 to the system by adding preloaded bungee or spring member 48 connecting cable 20 to the right arm 32 of quadrant 24, and preloaded bungee or spring 50 connecting cable 22 to the left arm 28 of quadrant 24. With this bungee crosstie arrangement, bungees 48 and 50, which may be rubber springs, are preferably equally preloaded so as to have cancelling and centering effects on the control system during usual control operation; however, if cable 20 is severed, bungee 48 will be unloaded while bungee 50 will remain preloaded and will impose a biasing force on quadrant 24 which will attempt to move it in a counterclockwise direction. Thus, utilizing only cable 22, by either applying tension to or by slackening the cable, the pilot can move quadrant 24 as desired in respectively a clockwise or counterclockwise direction, and can therefore overcome and utilize the influence of bungee 50 to position quadrant 24 in any desired control position. Similarly, if cable 22 were severed, bungee 50 would become unloaded, and preloaded bungee 48 would impose a clockwise motion creating moment on quadrant 24, which could be overcome selectively by the pilot by utilizing flexible cable 20 to position quadrant 24 in any desired control position.

If desired, centering spring member 52 can be connected to quadrant control arm 42 to impose a centering force upon quadrant 24 so as to bring it to the centered position shown in FIG. 1. It will accordingly be seen that the FIG. 1 flight control system as illustrated has third chance redundant in that the system can be controlled firstly by the pilot by utilizing both cables 20 and 22, or secondly by utilizing cable 20 when cable 22 is severed, (or by using cable 22 when cable 20 is severed,) and thirdly by the centering action of centering spring 52 when both cables 20 and 22 are severed.

While not necessarily so limited, centering spring mechanism 52 may be of the type shown in U.S. Pat. No. 3,532,302 issued to J. C. Dean on an Improved Tail Rotor Biasing Device.

It is important that the cross-tie bungees 48-50 not impose sideloads upon cables 20 and 22 and therefore, as best shown in FIG. 2, it is preferred that the preloaded bungees connect to the cables so as to be in substantially parallel orientation therewith. FIG. 2 shows preloaded bungee 50 so joined to cable 22 at connecting point 54 after passing around selectively positioned pulley or roller member 56 to effect a parallel relationship between preloaded bungee 50 and cable 22 at the point of connection 54 therebetween.

A modification and the preferred embodiment of my control system is shown in FIG. 3 and, where applicable, corresponding reference numerals used for the FIG. 1 configuration will be utilized. In the FIG. 3 construction, control quadrant 24 is similarly conventionally controlled by pilot controlled cables 20 and 22, with cable 20 reeved through aperture 60 in the left arm 28 of quadrant 24 and secured thereto by unidirectional retaining ball 62, while cable 22 is reeved through aperture 64 in the right arm 32 of the quadrant 24 and secured thereto by the unidirectional retaining ball 66. In the FIG. 3 construction, bungee 68, which consists of cable 70 and spring 72 is connected to cable 22 at ball 66 and extends therefrom over stacked or separately located pulley mechanism 73 and returns to connect to quadrant right arm 32 at connecting point 74. Similarly bungee 76, which consists of cable 78 and spring 80 connects to cable 20 at ball 62 and passes over stacked pulley mechanism 73 and then connects to the left arm 28 of quadrant 24 at connecting point 82.

During normal operation of the FIG. 3 construction, the pilot selectively pulls upon cable 20 or 22 utilizing the mechanism shown in FIG. 1 so that by applying a tension load to cable 20, quadrant 24 is caused to rotate in a counterclockwise direction and by applying a tension load on cable 22, the quadrant 24 is caused to rotate in a clockwise direction. Again, in the FIG. 3 construction as in the FIG. 1 construction, bungees 68 and 76 are preferably equally loaded so as to impose cancelling forces upon quadrant 24 during normal operation. If, however, cable 22 is severed in operation, bungee 68 is unloaded so that bungee 76 applies a force to quadrant 24 so as to induce clockwise rotation thereof. By applying or relaxing tension loading to cable 20, the pilot can selectively overcome or utilize the action of bungee 76 to selectively position quadrant 24 in any desired control position. Similarly, if cable 20 is severed, bungee 76 is unloaded, and bungee 68 serves to bias quadrant 24 in a counterclockwise direction and the pilot can apply or relax tension loads to cable 22 to selectively position the quadrant 24 by overcoming or utilizing the biasing effect of bungee 68. As in the FIG. 1 construction, the FIG. 3 construction is third chance redundant in that quadrant 24 can be controlled by the combination of cables 20 and 22, and by cable 20 when cable 22 is severed (or by cable 22 when cable 20 is severed) and when centering spring 52 is used in connection with the FIG. 3 embodiment, the system becomes third chance as described earlier in connection with FIG. 1.

Perferably, conventional indicators 84 and 86 are positioned in bungees 76 and 68, respectively, as shown in FIG. 3, and serve to provide a signal to the pilot as to whether the respective bungees are preloaded, thereby making the pilot aware of the number of control options available to him.

An advantage of the FIG. 3 construction over the FIG. 1 construction is that it offers redundancy for cable breaks all the way to the quadrant. In the FIG. 1 construction, if either cable were severed between quadrant 24 and the point of connection of its associated preloaded bungee, control in one direction would be lost unless that bungee was also severed. Should the FIG. 1 embodiment be preferred, armor plating can be used to protect the flexible cable and bungees in the vulnerable areas.

Further details of my flight control system 10 to which this invention does not relate will be found in U.S. Pat. No. 3,199,601 issued to J. C. Dean et al on an Improved Flight Control System.

I wish it to be understood that I do not desire to be limited to the exact details of construction shown and described, for obvious modifications will occur to a person skilled in the art.

I claim:

1. A flight control system including:
   (A) a quadrant member mounted for clockwise and counterclockwise motion about an axis of rotation and including a left arm member and a right arm member extending on opposite sides of the axis of rotation
   (B) output means responsive to quadrant rotation,
   (C) a first flexible cable member connected to the quadrant right arm to cause clockwise rotation thereof,
   (D) a second flexible cable member connected to the quadrant left arm to cause counterclockwise rotation thereof,
   (E) means to actuate said cable members, and
   (F) a first preloaded spring member connecting said first cable member to said quadrant member and a second preloaded spring member connecting said second cable member to said quadrant member so that if either of said cable members is severed, said spring members will cause said quadrant member to rotate in the same direction that the severed cable caused the quadrant member to rotate when operative.

2. A control system according to claim 1 wherein said first preloaded spring member connects said first cable member to said quadrant right arm and said second spring member connects second cable member to said quadrant left arm.

3. A control system according to claim 1 wherein said first spring member connects said first cable member to said quadrant left arm and said second spring member connects said second cable member to said quadrant right arm.

4. A control system according to claim 1 and including roller members across which said spring members pass in connecting said cable members to said quadrant member and which roller members are selectively positioned so that said spring members are joined to said cable members in substantially parallel relationship.

5. A control system according to claim 2 wherein said first cable member is connected to the quadrant right arm and extends therebeyond across a pulley member and wherein said first spring member is connected to said quadrant member right arm and is joined to the first cable member so as to pass over the pulley member when so joined and wherein said second cable member is connected to said quadrant left arm and extends therebeyond across a pulley member, and wherein said second spring member is connected to said quadrant member left arm and is joined to said second cable member so as to also pass over said pulley member when so joined.

6. A control system according to claim 1 and including centering spring means operative to bias the quadrant member to a predetermined position.

7. A control system according to claim 2 and wherein said flexible cable members are reeved through apertures in said quadrant member left arm member and right arm members, respectively, and including unidirectional retaining balls connected to said cables and cooperating with said apertures to connect said cables to said quadrant member.

8. A control system including:
(A) a quadrant member mounted for clockwise and counterclockwise motion about an axis of rotation and including a left arm member and a right arm member extending on opposite sides of the axis of rotation,
(B) output means responsive to quadrant rotation,
(C) a first flexible cable member connected to the quadrant right arm to cause clockwise rotation thereof,
(D) a second flexible cable member connected to the quadrant left arm to cause counterclockwise rotation thereof,
(E) means to actuate said cable members, and
(F) means connecting said flexible cable members to said quadrant member so that when either of said flexible cable members is severed the other flexible cable member becomes operative to effect both clockwise and counterclockwise control motion of said quadrant member.

* * * * *